(12) United States Patent
Wei et al.

(10) Patent No.: US 8,476,883 B2
(45) Date of Patent: Jul. 2, 2013

(54) COMPENSATION CIRCUITS AND CONTROL METHODS OF SWITCHED MODE POWER SUPPLY

(75) Inventors: Da-Chun Wei, Hsin-Chu (TW); Wen-Chung Yeh, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 243 days.

(21) Appl. No.: 13/026,282

(22) Filed: Feb. 13, 2011

(65) Prior Publication Data

US 2011/0211372 A1 Sep. 1, 2011

(30) Foreign Application Priority Data

Feb. 26, 2010 (TW) .............................. 99105642 A

(51) Int. Cl.
*G05F 1/652* (2006.01)
*G05F 1/613* (2006.01)

(52) U.S. Cl.
USPC ........... 323/282; 323/284; 323/288; 323/271; 323/222; 323/223; 323/224

(58) Field of Classification Search
USPC ................. 323/282, 284, 288, 271, 222, 223, 323/224
See application file for complete search history.

(56) References Cited

U.S. PATENT DOCUMENTS

| 7,471,072 | B2 * | 12/2008 | Fogg et al. | 323/284 |
| 7,557,545 | B2 * | 7/2009 | Naka et al. | 323/223 |
| 7,595,624 | B2 * | 9/2009 | Tateishi et al. | 323/288 |
| 2009/0284992 | A1 * | 11/2009 | Kenly et al. | 363/21.06 |

* cited by examiner

*Primary Examiner* — Bao Q Vu
(74) *Attorney, Agent, or Firm* — Winston Hsu; Scott Margo

(57) ABSTRACT

A compensation circuit has a resistor, a switch and a compensation capacitor. The resistor and the switch are connected in series between a power node and a compensation node. The compensation capacitor is connected to the compensation node, whose voltage is responsive to the output power source. For a predetermined period of time after the voltage falls below a predetermined value, the switch is open and no current flows through the resistor from the power node to the compensation node.

14 Claims, 9 Drawing Sheets

COMPENSATION CIRCUITS AND CONTROL METHODS OF SWITCHED MODE POWER SUPPLY

CROSS REFERENCE TO RELATED APPLICATIONS

This application claims priority to Taiwan Application No. 099105642, filed Feb. 26, 2010, and which is incorporated herein by reference in its entirety for all intents and purposes.

BACKGROUND OF THE INVENTION

1. Field of the Invention

The present invention relates to a power supply.

2. Description of the Prior Art

Power supplies are utilized for converting power to provide power conforming to specifications to an electronic device or component. When concerned with conversion efficiency, energy consumed by a power supply should be as low as possible. Particularly in low-load or no-load conditions, slight energy consumption by a power supply results in a great reduction of conversion efficiency. Thus, reduction of energy loss in low-load or no-load configurations is a goal of designers.

In low-load or no-load situations, a switched-mode power supply is designed to operate in skip mode or burst mode. In theory, skip mode and burst mode stop multiple, consecutive, ineffective switching cycles, and concentrate energy conversion into multiple, consecutive, relatively effective switching cycles. However, skip mode and burst mode are likely to exhibit unpleasant audio noise if energy conversion is not appropriately controlled in effective switching cycles.

These and other objectives of the present invention will no doubt become obvious to those of ordinary skill in the art after reading the following detailed description of the preferred embodiment that is illustrated in the various figures and drawings.

DETAILED DESCRIPTION

In the following description, a flyback switched-mode power supply (converter) is used as an example. However, other power supply architectures, such as a boost, buck, or other type of architecture may be used as well.

Figure 1:
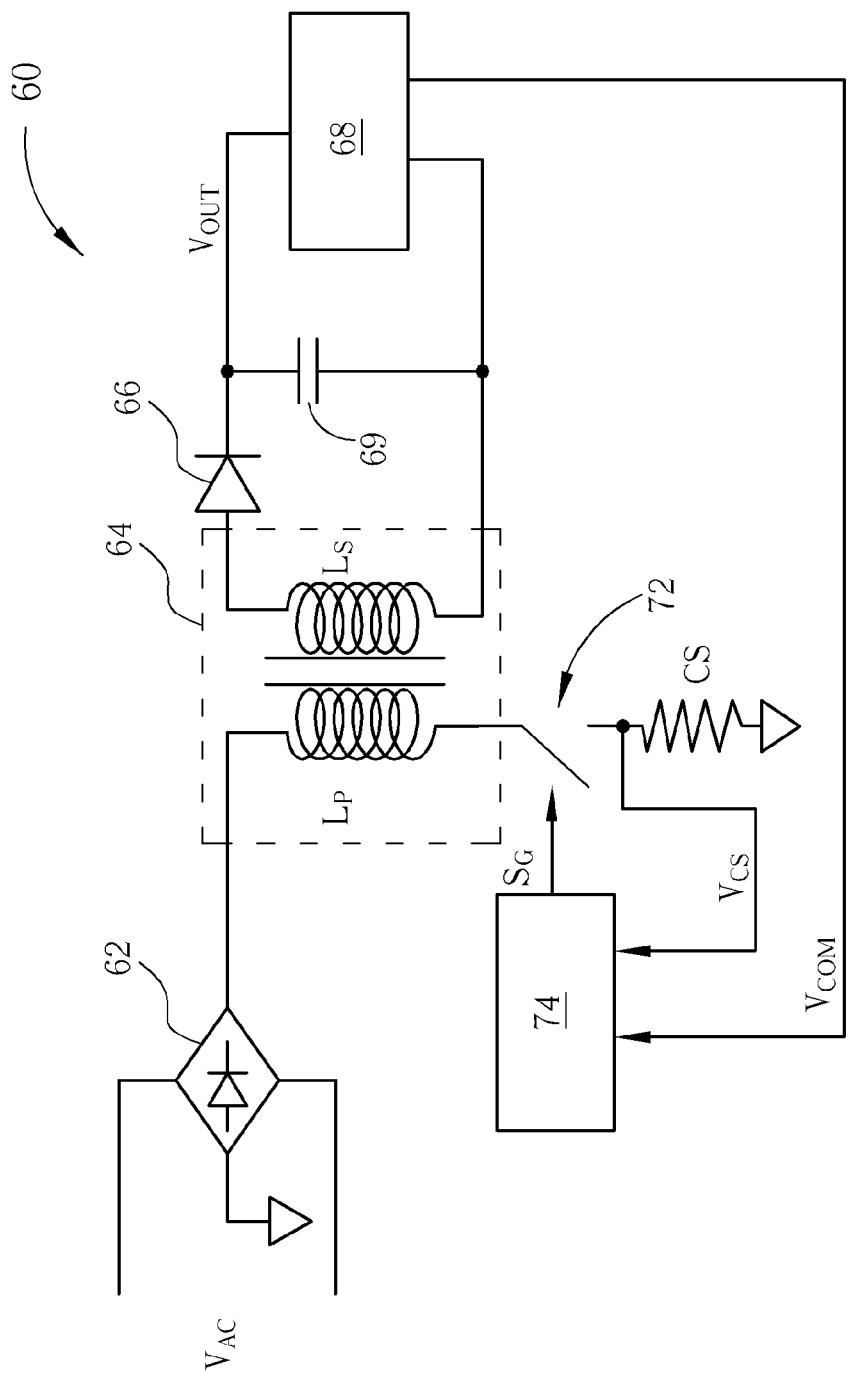
FIG. 1 is a diagram of power management device according to one embodiment of the present invention.

FIG. 1 is a diagram of power management device 60 for converting energy outputted by alternating current (AC) voltage $V_{AC}$ to output voltage $V_{OUT}$ satisfying specification requirements. Bridge rectifier 62 rectifies AC voltage $V_{AC}$. Controlled by gate signal $S_G$, power switch 72 manipulates current of primary coil $L_p$ of transformer 64 for controlling energizing or de-energizing of transformer 64. Electrical energy released by transformer 64 is stored through bridge rectifier 66 on output capacitor 69 for generating output voltage $V_{OUT}$. Feedback circuit 68 senses magnitude (such as current, voltage, or power) of output voltage $V_{OUT}$ for providing compensation signal $V_{COM}$ to compensation terminal of controller 74. Compensation signal $V_{COM}$ is responsive to output voltage $V_{OUT}$. For example, voltage of compensation signal $V_{COM}$ going high represents output voltage $V_{OUT}$ outputs high power to a load. Controller 74 also receives sensing signal $V_{CS}$ of current sensing resistor $C_S$ for periodically switching power switch 72. In one embodiment, controller 74 is an integrated circuit (IC). In another embodiment, controller 74 and power switch 72 are integrated into one integrated circuit.

Figure 2:
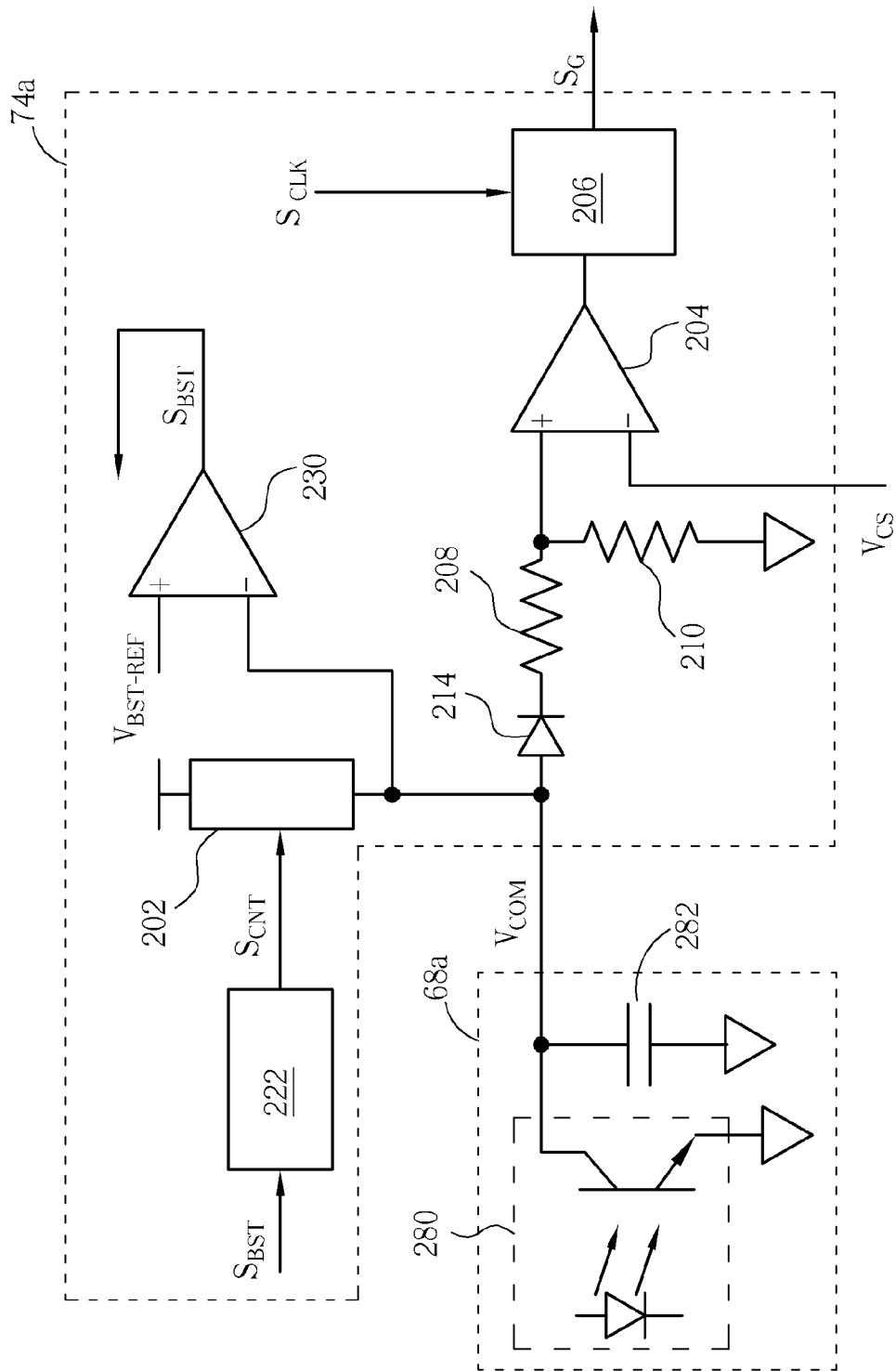
FIG. 2 shows a controller and a feedback circuit usable in FIG. 1.

FIG. 2 shows controller 74a and feedback circuit 68a usable in FIG. 1. Feedback circuit 68a comprises photo coupler 280 and compensation capacitor 282. For example, brightness of light emitting diode of photo coupler 280 strengthens with increased voltage level of output voltage $V_{OUT}$, thereby increasing current drained from controller 74a. Compensation capacitor 282 roughly causes compensation signal $V_{COM}$ to remain approximately in a quasi-steady state. In controller 74a, voltage of compensation signal $V_{COM}$ drops over diode 214, and divider voltage result of resistors 208, 210 is utilized for comparison with sensing signal $V_{CS}$. Comparison result is outputted by comparator 204, and controls power switch 72 through driving circuit 206. Thus, voltage level of compensation signal $V_{COM}$ substantially corresponds to peak voltage of sensing signal $V_{CS}$, and may determine energy conversion energy of transformer 64 in a switching cycle.

Tunable resistor 202 and photo coupler 280 roughly determine voltage level of compensation signal $V_{COM}$. Tunable resistor 202 is equivalent to an impedance device whose resistance value is controlled by signal $S_{CNT}$. When voltage level of compensation signal $V_{COM}$ is approximately less than burst reference voltage $V_{BST-REF}$, power management device 60 should enter a power-saving mode, such as burst mode. For example, signal $S_{BST}$ sent by comparator 230 causes power switch 72 to remain in turned off state, stopping any increase in energizing of transformer 64. When voltage level of compensation signal $V_{COM}$ is approximately higher than burst reference voltage $V_{BST-REF}$, power management device 60 should enter a non-power-saving mode, such as normal operation, in which transformer 64 continues to convert energy.

Signal $S_{BST}$ generates signal $S_{CNT}$ through soft-connection circuit 222, and roughly determines equivalent resistance of tunable resistor 202. Equivalent resistance as used herein may refer to voltage drop across tunable resistor 202 divided by average current flowing through tunable resistor 202 over a period of time, and may also refer to average resistance of tunable resistor 202 over a period of time. This period of time may be a switching cycle defined by clock signal $S_{CLK}$.

In some embodiments, when operating in non-power-saving mode, equivalent resistance of tunable resistor 202 is approximately a corresponding small resistance $R_S$. When steady operating in power-saving mode, equivalent resistance of tunable resistor 202 is approximately a corresponding large resistance $R_L$. In power-saving mode, current flowing through tunable resistor 202 may be reduced, such that power consumed by tunable resistor 202 may be reduced.

In some embodiments, when voltage level of compensation signal $V_{COM}$ drops below burst reference voltage $V_{BST-REF}$, which is when transition from non-power-saving mode to power-saving mode occurs, equivalent resistance of tunable resistor 202 immediately increases from resistance $R_S$ to resistance $R_L$. When voltage level of compensation signal $V_{COM}$ goes over burst reference voltage $V_{BST-REF}$, which is when transition from power-saving mode to non-power-saving mode occurs, equivalent resistance of tunable resistor 202 gradually decreases from resistance $R_L$. This mechanism for gradually changing resistance is defined here as soft-connection, and time consumed by this mechanism is called soft-connection time. Soft-connection may lower risk of generating abnormal audio sounds.

Figure 3A:
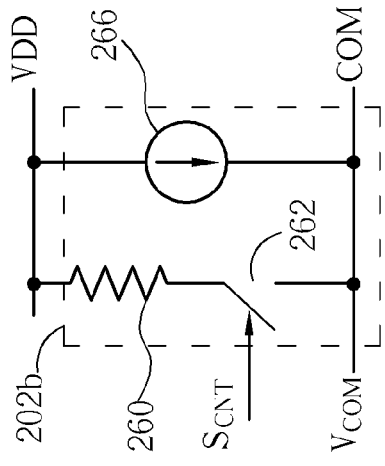
FIG. 3A and FIG. 3B are two tunable resistors which may be utilized with embodiment of FIG. 2.
Figure 3B:
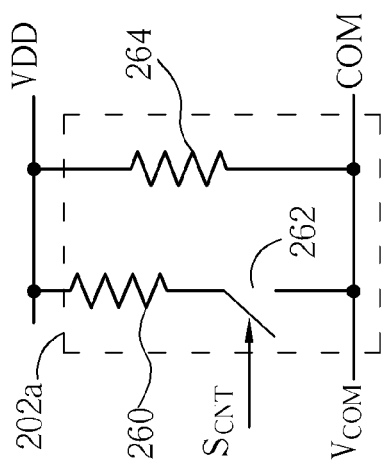

FIG. 3A and FIG. 3B are two tunable resistors 202a, 202b, which may be utilized with embodiment of FIG. 2. Tunable resistor 202a is between voltage source terminal $V_{DD}$ and compensation terminal COM, and comprises resistor 260 in series with switch 262, and resistor 264 in parallel with resistor 260 and switch 262, as shown in FIG. 3A. Switch 262 is controlled by signal $S_{CNT}$. In non-power-saving mode, signal $S_{CNT}$ causes switch 262 to remain in short-circuit state, and resistor 260 connection to compensation terminal COM is fixed, so equivalent resistance of tunable resistor 202a is resistance of parallelly-connected resistor 260 and resistor 264. In power-saving mode, signal SCNT causes switch 262 to remain in open-circuit state, and current cannot flow through resistor 260, so equivalent resistance of tunable resistor 202a is only resistance of resistor 264. During soft-connection time after transitioning from power-saving mode into non-power-saving mode, signal $S_{CNT}$ periodically switches switch 262, and gradually increases time switch 262 spends in short-circuit state in each switching cycle, increasing duty cycle of switch 262. For example, during soft-connection time, duty cycle of switch 262 increases gradually from 0% to 100%. Thus, it is equivalent to say that resistor 260 gradually connects to compensation terminal COM during soft-connection time, and equivalent resistance of tunable resistor 202a gradually decreases.

In FIG. 3B, different from FIG. 3A, constant current source 266 (whose resistance is infinitely large in theory) replaces resistor 264 of FIG. 3A. In non-power-saving mode, signal $S_{CNT}$ causes resistor 260 to connect to compensation terminal COM, so that equivalent resistance of tunable resistor 202b may be seen as only comprising resistance of resistor 260. In power-saving mode, switch 262 is open, so that equivalent resistance of tunable resistor 202b is only resistance of constant current source 266. During soft-connection time, signal $S_{CNT}$ switches switch 262, and gradually increases duty cycle of switch 262.

Figure 4A:
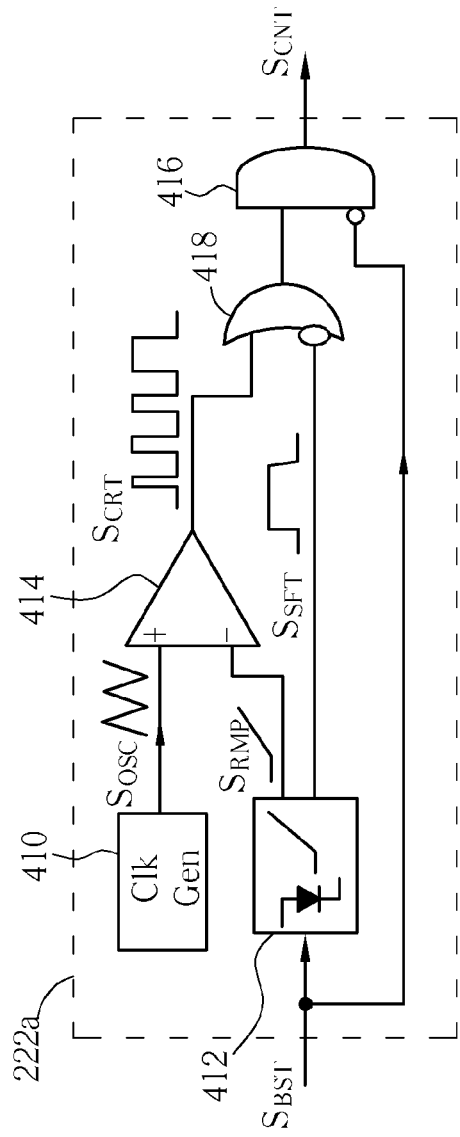
FIG. 4A is a soft-connection circuit.

Soft-connection circuit 222a of FIG. 4A may be utilized in FIG. 2 for controlling tunable resistors 202a, 202b of FIG. 3A or FIG. 3B, respectively, to have soft-connection mechanism. Ramp signal generator 412 is triggered by falling edge of signal $S_{BST}$, and may generate ramp signal $S_{RMP}$ and single pulse signal $S_{SFT}$. Single pulse signal $S_{SFT}$ represents start and end of soft-connection time. Clock generator 410 generates triangle wave signal $S_{OSC}$. Comparator 414 compares triangle wave signal $S_{OSC}$ and ramp signal $S_{RMP}$ to generate control signal $S_{CRT}$.

Figure 5:
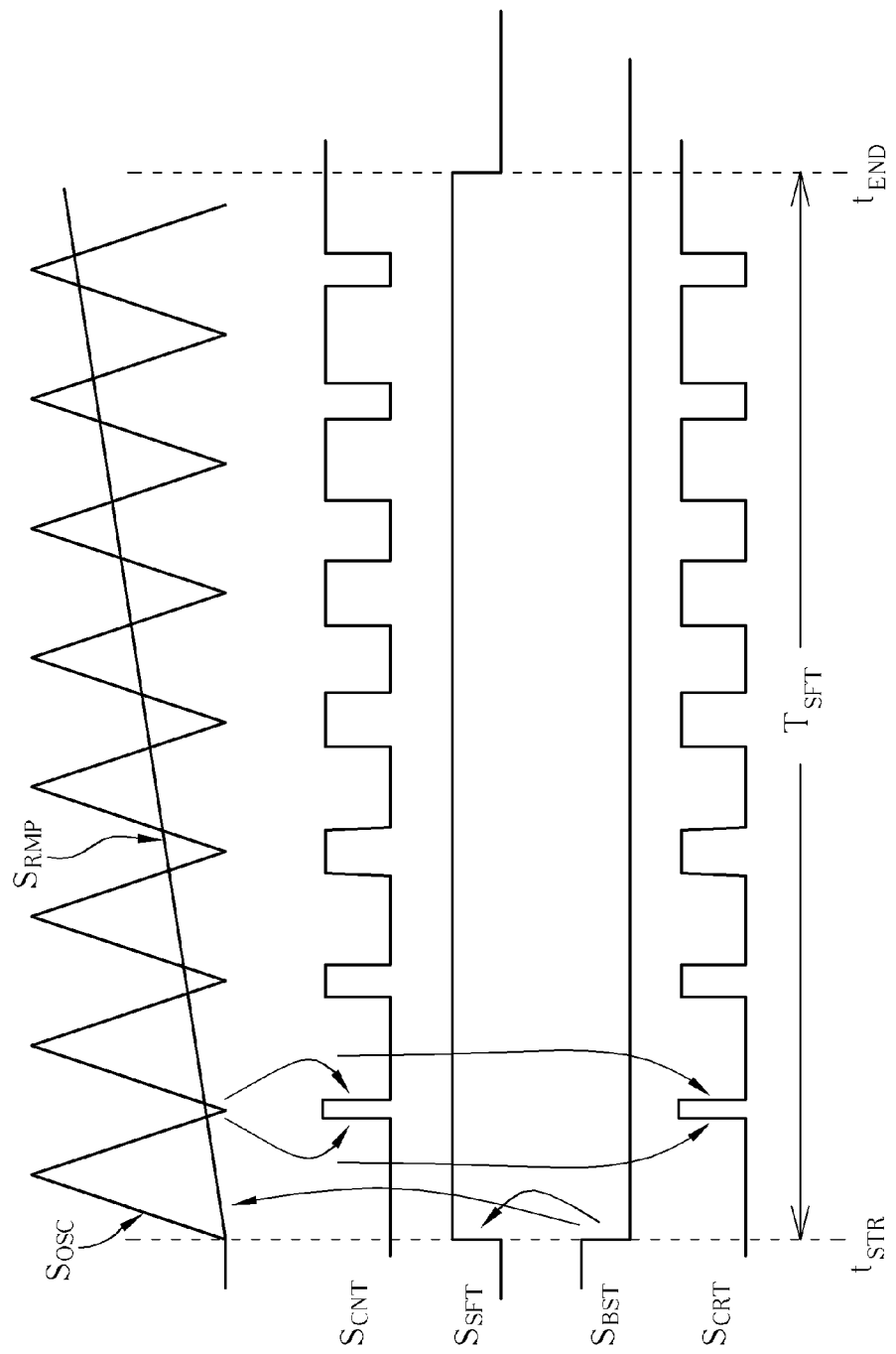
FIG. 5 is a timing diagram of signals in FIG. 4A.

FIG. 5 is a timing diagram of signals in FIG. 4A. Please refer simultaneously to FIG. 4A and FIG. 5. Before time $t_{STR}$, signal $S_{BST}$ at logic "1" refers to power-saving mode. At this time, AND gate 416 causes signal $S_{CNT}$ to remain at logic "0", keeping switch 262 of FIG. 3A or FIG. 3B in open-circuit state. At time $t_{STR}$ signal $S_{BST}$ changes state from logic "1" to logic "0", meaning transition from power-saving mode to non-power-saving mode, so that ramp signal generator 412 is triggered to generate single pulse signal $S_{SFT}$ and ramp signal $S_{RMP}$. Single pulse signal $S_{SFT}$ defines soft-connection time $T_{SFT}$. Parts of ramp signal $S_{RMP}$ higher than triangle wave signal $S_{OSC}$ cause control signal $S_{CRT}$ to be logic "1". It can be seen from FIG. 5 that time control signal $S_{CRT}$ is set to logic "1" increases with the increase in ramp signal $S_{RMP}$. During soft-connection time $T_{SFT}$, OR gate 418 in FIG. 4A and AND gate 416 cause control signal $S_{CRT}$ to act directly as signal $S_{CNT}$, so that proportion of signal $S_{CNT}$ at logic "1" in each switching cycle gradually increases, as shown in FIG. 5. Thus, during soft-connection time $T_{SFT}$, duty cycle of switch 262 gradually increases. After soft-connection time $T_{SFT}$, OR gate 418 continually outputs logic "1" due to signal $S_{SFT}$ being at logic "0". Thus, signal $S_{CNT}$ is continually at logic "1", causing switch 262 to be short-circuited.

Figure 4B:
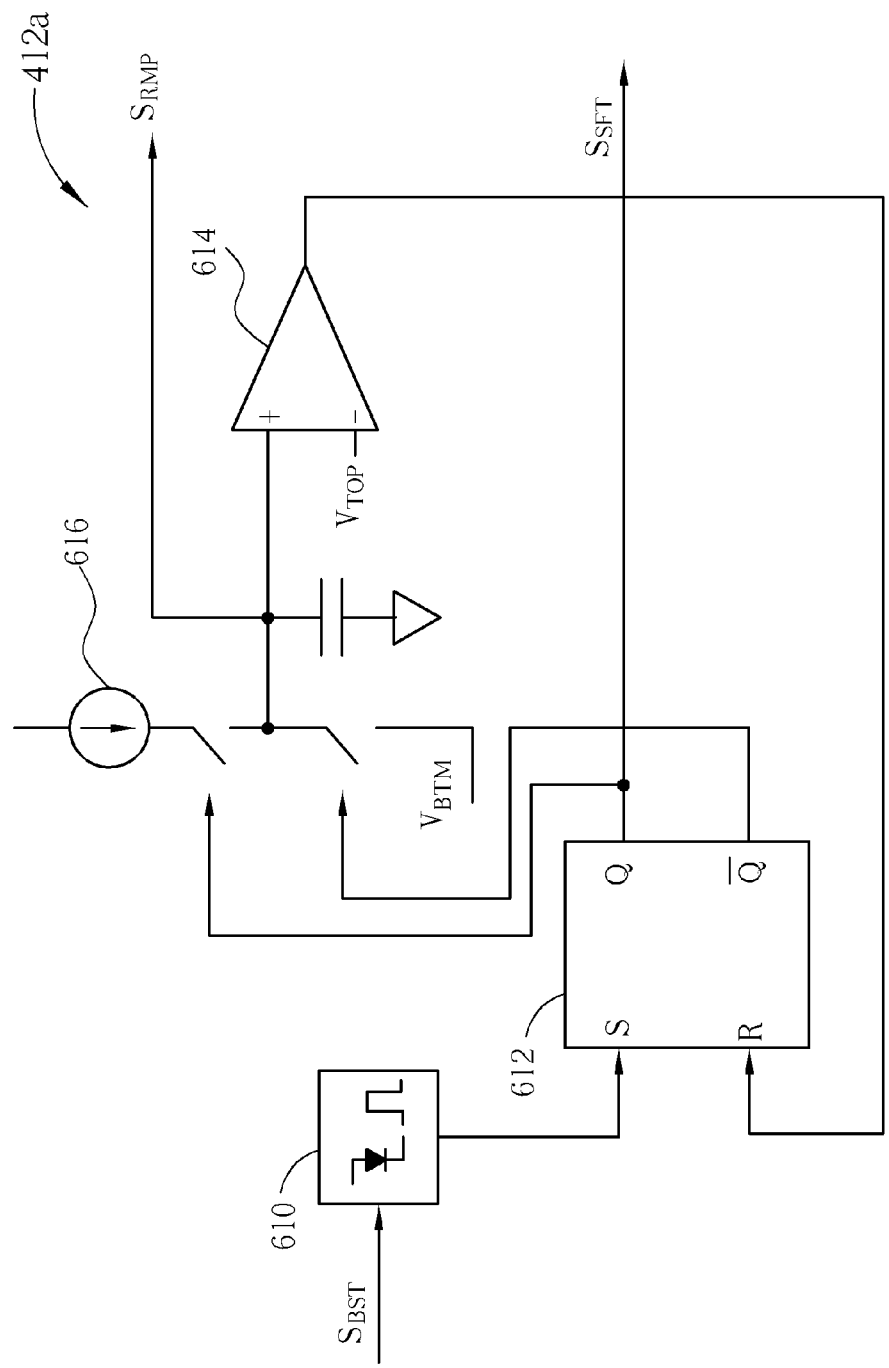
FIG. 4B is an embodiment of ramp signal generator of FIG. 4A.

FIG. 4B is an embodiment 412a of ramp signal generator 412 in FIG. 4A. When signal $S_{BST}$ is at logic "1", ramp signal $S_{RMP}$ remains at fixed voltage $V_{BTM}$. When signal $S_{BST}$ changes state to logic "0", single pulse generator 610 sends out a short pulse, causing signal $S_{SFT}$ to be at logic "1", and current source 616 to begin charging capacitor, voltage level of ramp signal $S_{RMP}$ to rise. When ramp signal $S_{RMP}$ reaches fixed voltage $V_{TOP}$, comparator 614 causes signal $S_{SFT}$ to be at logic "0", discharging capacitor, so that ramp signal $S_{RMP}$ returns to fixed voltage $V_{BTM}$.

Figure 6:
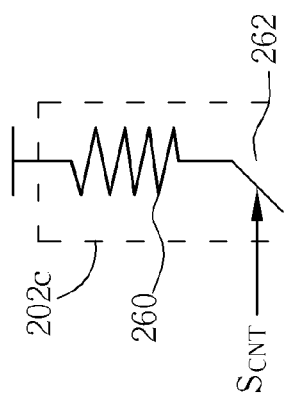
FIG. 6 is another tunable resistor usable in embodiment of FIG. 2.

FIG. 6 is another tunable resistor 202c usable in embodiment of FIG. 2. FIG. 6 is different from FIG. 3B and FIG. 3A in that when switch 262 of FIG. 6 is in open-circuit state, no current flows between voltage source terminal $V_{DD}$ and compensation terminal COM. During non-power-saving mode, signal $S_{CNT}$ causes fixed connection of resistor 260 to node COM, so that equivalent resistance of tunable resistor 202c is resistance of resistor 260. During power-saving mode, signal $S_{CNT}$ causes current flowing through resistor 260 only to flow to node COM while clock signal $S_{CLK}$ is at logic "1". Thus, equivalent resistance of tunable resistor 202c is roughly equal to resistance of resistor 260 divided by duty cycle of clock signal $S_{CLK}$ at logic "1". For example, if duty cycle of clock signal $S_{CLK}$ at logic "1" is approximately fixed at 25% during power-saving mode, equivalent resistance of tunable resistor 202c increases four times. During soft-connection time after entering non-power-saving mode from power-saving mode, signal $S_{CNT}$ switches switch 262, and gradually increases duty cycle of switch 262 in each switching cycle. For example, during soft-connection time, duty cycle of switch 262 may increase from 25% to 100%. Thus, during soft-connection time, it is equivalent to say that resistor 260 gradually connects to compensation terminal COM, and equivalent resistance of tunable resistor 202c gradually decreases.

Figure 7:
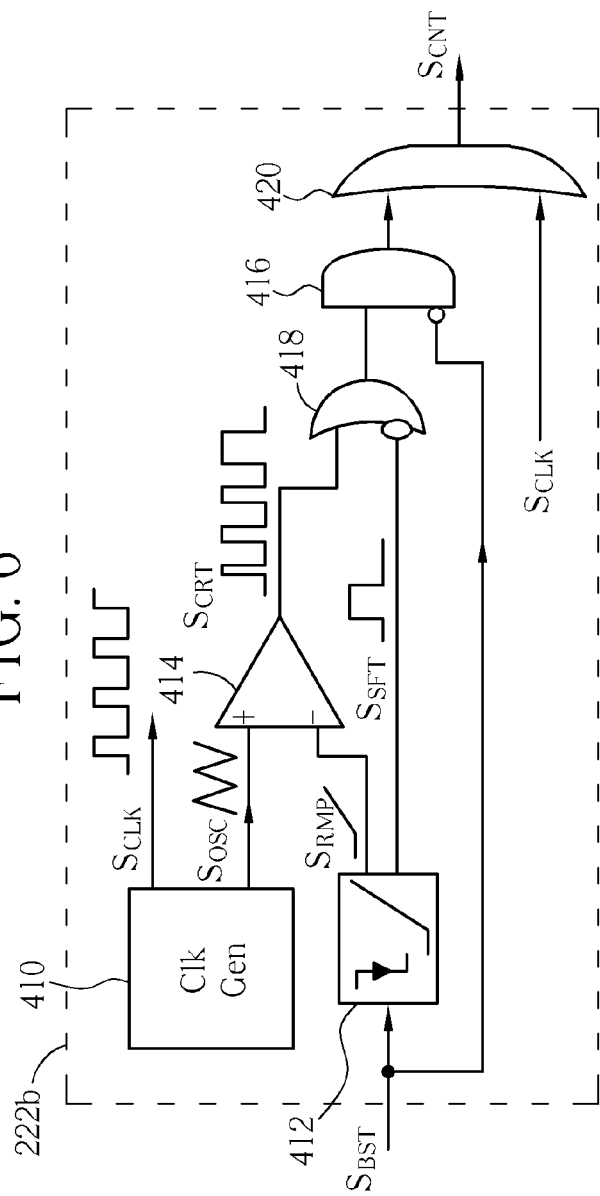
FIG. 7 illustrates a soft-connection circuit that may be used in FIG. 2 for controlling tunable resistor of FIG. 6.

FIG. 7 is a soft-connection circuit 222b that may be used in FIG. 2 for controlling tunable resistor 202c of FIG. 6 to have soft-connection mechanism. FIG. 7 is similar to FIG. 4, and similar functions and elements are not described herein. FIG. 7 adds another OR gate 420, such that turn-on time of signal $S_{CNT}$ is no shorter than time of clock signal $S_{CLK}$ at logic "1".

Figure 8A:
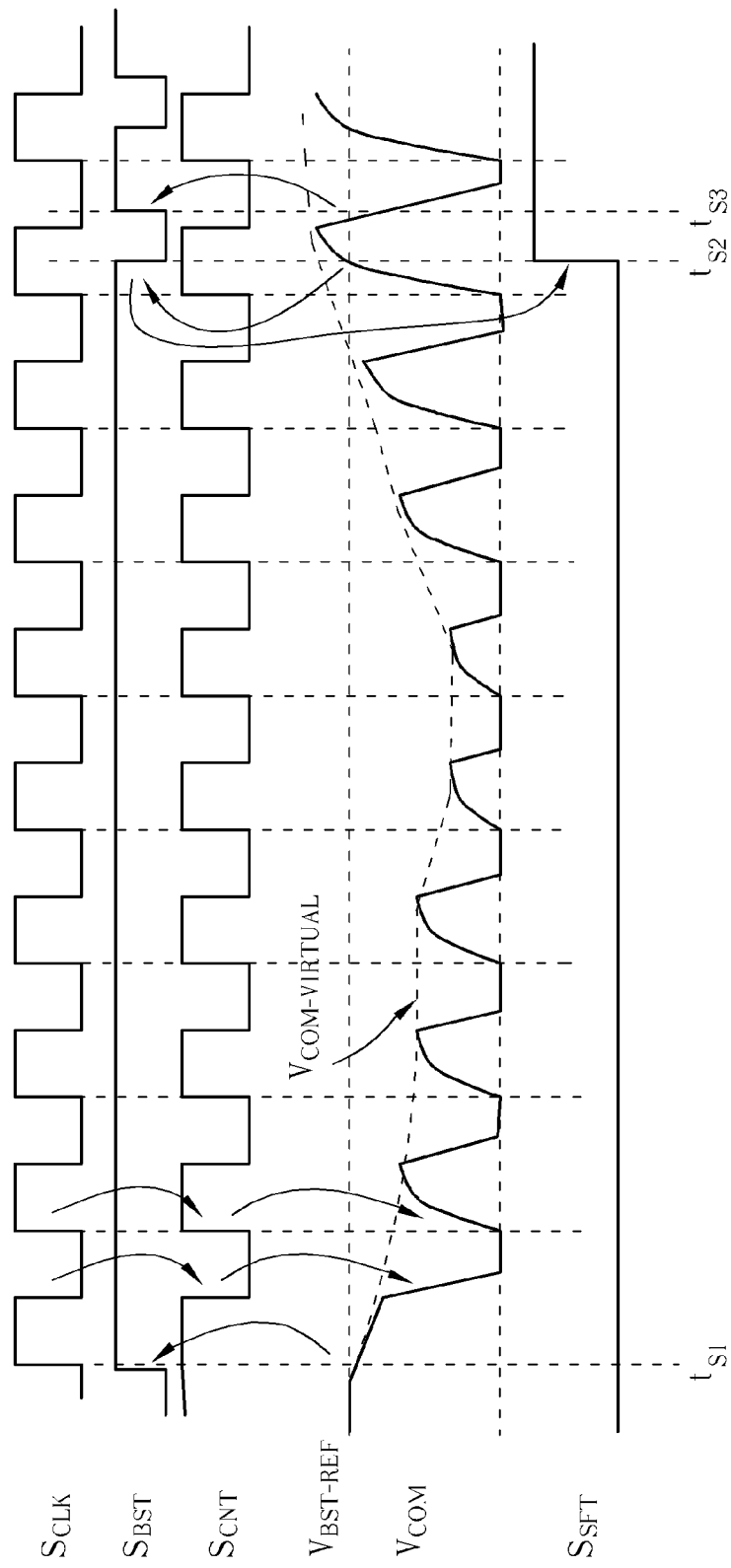
FIG. 8A and FIG. 8B are signal timing diagrams of circuits in FIG. 7 and FIG. 6.
Figure 8B:
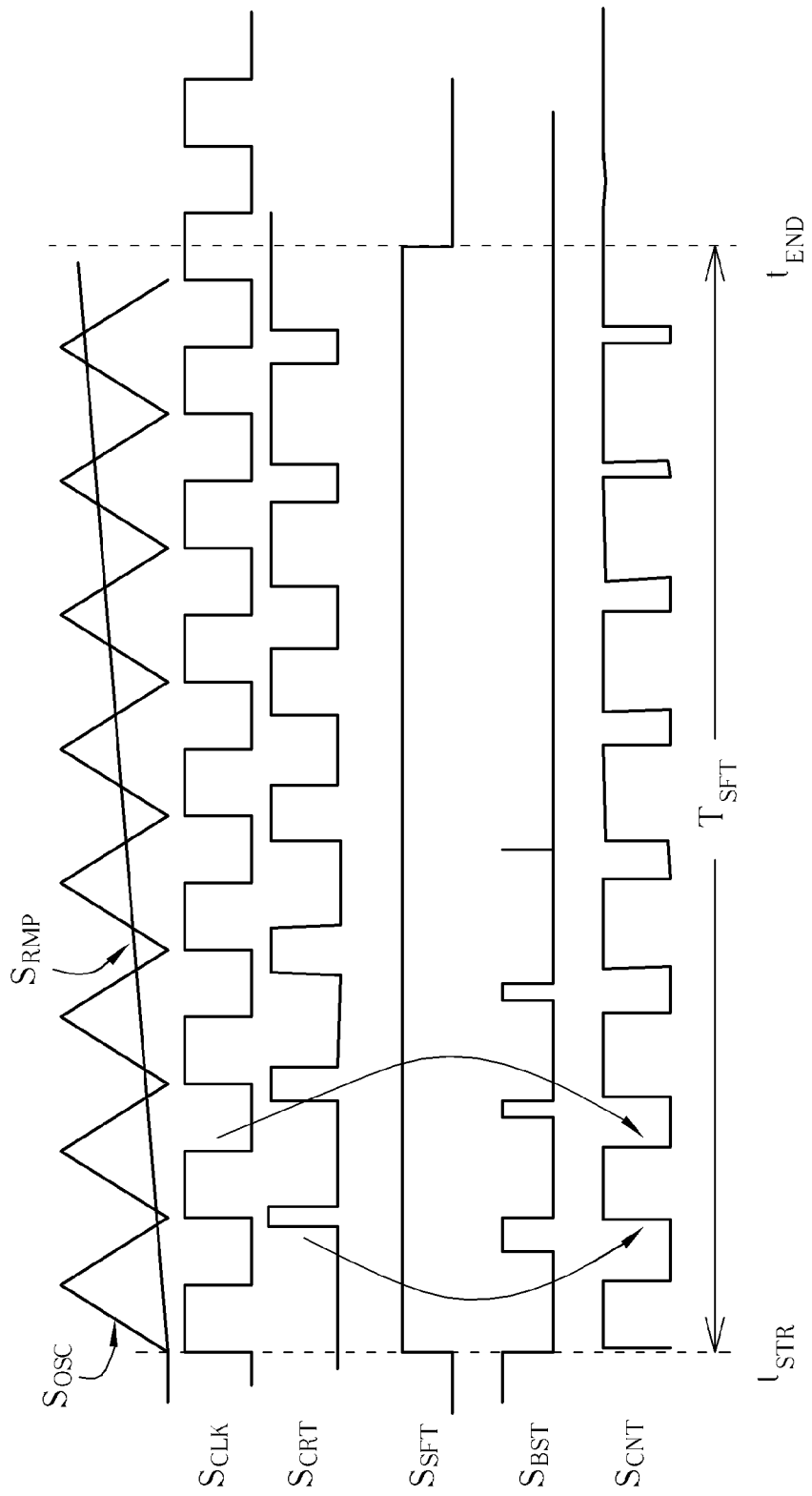

FIG. 8A and FIG. 8B are signal timing diagrams of circuits in FIG. 7 and FIG. 6. FIG. 8A illustrates signal timing of entering power-saving mode. FIG. 8B illustrates signal timing during soft-connection time after entering non-power-saving mode from power-saving mode.

As shown in FIG. 8A, after entering power-saving mode at time $t_{S1}$, signal $S_{CNT}$ increases/decreases with clock signal $S_{CLK}$. When signal $S_{CNT}$ turns off switch 262 of tunable resistor 202c, compensation signal $V_{COM}$ is rapidly pulled down to ground due to lack of charging current. When signal $S_{CNT}$ shorts switch 262 of tunable resistor 202c, compensation signal $V_{COM}$ starts tracing stable compensation signal $V_{COM\text{-}VIRTUAL}$ with RC delay, which represents predicted voltage of compensation signal $V_{COM}$ when switch 262 of tunable resistor 202c is constantly in short-circuit state. Only when compensation signal $V_{COM}$ is following stable compensation signal $V_{COM\text{-}VIRTUAL}$, and its voltage exceeds burst reference voltage $V_{BST\text{-}REF}$ is single pulse signal $S_{SFT}$ triggered, starting soft-connection, as shown at time $t_{S2}$. During soft-connection time, duty cycle of switch 262 increases gradually. During soft-connection time, compensation signal $V_{COM}$ lower than burst reference voltage $V_{BST\text{-}REF}$ caused by switch 262 being open-circuited should be ignored, and should not influence soft-connection time, as shown by time $t_{S3}$.

As shown in FIG. 8B, during soft-connection time $T_{SFT}$, duty cycle of signal $S_{CNT}$ at logic level "1" gradually increases because of the OR operation performed on signal $S_{CRT}$ and clock signal $S_{CLK}$. As shown in FIG. 8B, during soft-connection time $T_{SFT}$, even if signal $S_{BST}$ changes state to logic "1", it will be ignored, and will not influence ramp signal $S_{RMP}$ and soft-connection time $T_{SFT}$.

Figure 9:
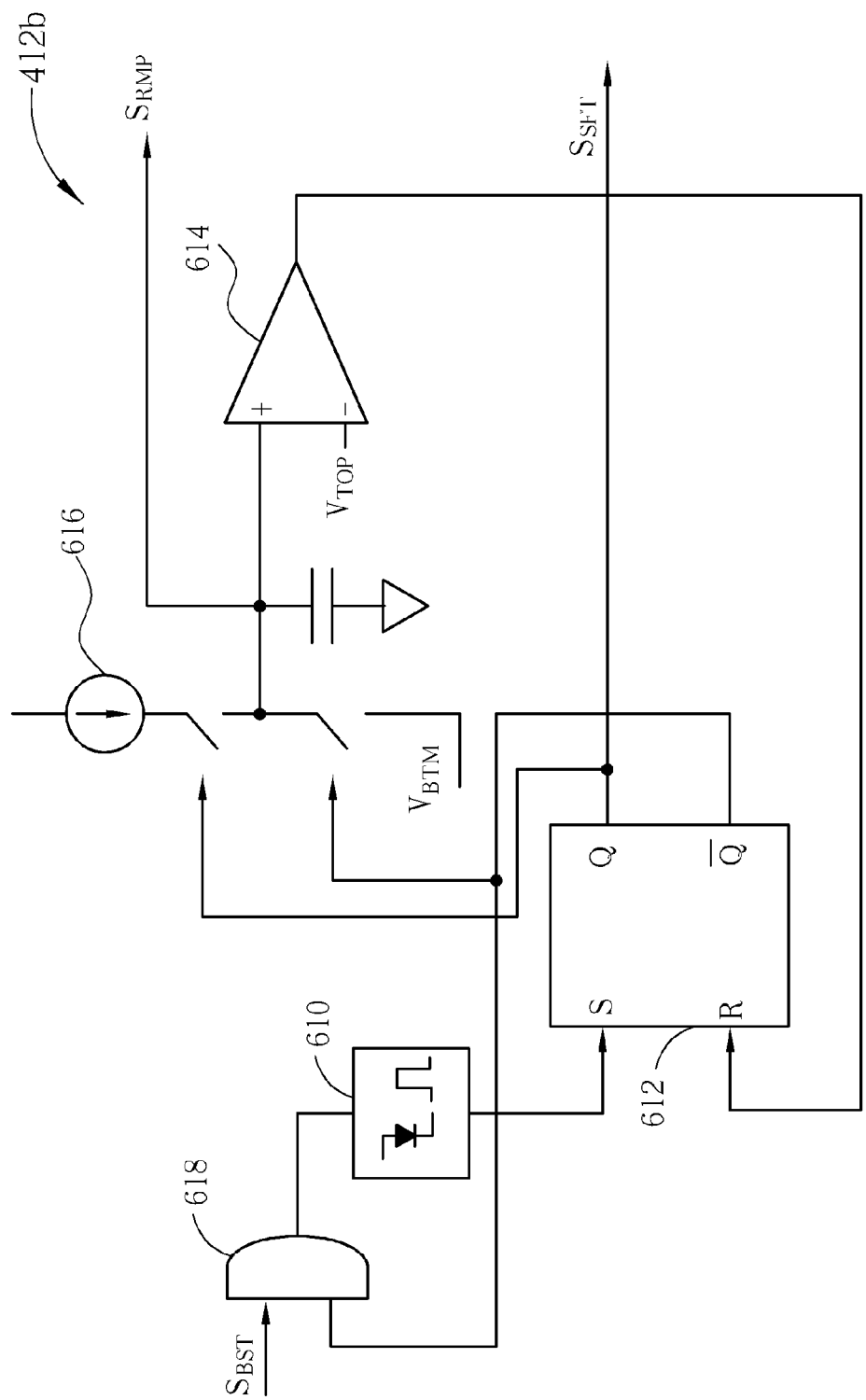
FIG. 9 illustrates ramp signal generator usable in soft-connection circuit of FIG. 7.

FIG. 9 illustrates ramp signal generator 412b usable in soft-connection circuit 222b of FIG. 7. FIG. 9 is similar to FIG. 4B, with FIG. 9 adding only one AND gate 618 for blocking path of signal $S_{BST}$ to single pulse generator 610 during soft-connection time $T_{SFT}$ when signal $S_{SFT}$ is at logic "1".

From the above embodiments, it can be seen that equivalent resistances of tunable resistors 202a, 202b, and 202c are greater in power-saving mode than in non-power-saving mode. Thus, power consumption may be reduced in power-saving mode. When entering non-power-saving mode from power-saving mode, tunable resistors 202a, 202b, and 202c gradually decrease, which may reduce risk of generating abnormal audio sounds.

Those skilled in the art will readily observe that numerous modifications and alterations of the device and method may be made while retaining the teachings of the invention.

What is claimed is:

1. A compensation circuit for use in a switched-mode power supply for providing an output power source, the compensation circuit comprising:
    a resistor and a switch coupled in series between a power node and a compensation node;
    a compensation capacitor coupled to the compensation node;
    a soft-connection circuit coupled to the switch for gradually reducing equivalent resistance generated by the resistor and the switch for a predetermined soft-connection period after compensation voltage of the compensation node exceeds a predetermined value; and
    wherein the compensation voltage of the compensation node is responsive to the output power source, and the switch is open and no current flows through the resistor from the power node to the compensation node for a predetermined period of time after the compensation voltage falls below the predetermined value.

2. The compensation circuit of claim 1, wherein the switched-mode power supply has a power switch and an inductive device, the power switch is used for controlling energizing or de-energizing of the inductive device, and the power switch stays open when the compensation voltage is lower than the predetermined value.

3. The compensation circuit of claim 1, wherein the switch is always open when the compensation voltage is lower than the predetermined value.

4. The compensation circuit of claim 1, wherein the switch is periodically switched between open and short states when the compensation voltage is lower than the predetermined value.

5. The compensation circuit of claim 1, wherein the soft-connection circuit controls the switch to switch periodically between open and short states.

6. The compensation circuit of claim 5, wherein the soft-connection circuit controls duty cycle of the switch to increase gradually in the predetermined soft-connection period.

7. The compensation circuit of claim 1, wherein no current flows from the power node to the compensation node when the switch is open.

8. A method of controlling a switched-mode power supply comprising a power switch and an inductive device, the power switch utilized for controlling energizing and de-energizing of the inductive device, the method comprising:
    providing a resistive device between a power node and a compensation node, the compensation node coupled to a compensation capacitor;
    setting equivalent resistance of the resistive device to a first predetermined value after compensation voltage of the compensation node falls below a predetermined value; and
    setting the equivalent resistance of the resistive device lower than the first predetermined value and gradually lowering the equivalent resistance after compensation voltage of the compensation node exceeds the predetermined value.

9. The method of claim 8, wherein the resistive device comprises a switch, the method further comprising:
    periodically switching the switch between open and short states after compensation voltage of the compensation node falls below the predetermined value.

10. The method of claim 8, wherein the resistive device comprises a switch, the method further comprising:
    the switch staying open after compensation voltage of the compensation node falls below the predetermined value.

11. The method of claim 8, wherein the resistive device comprises a switch, the method further comprising:
    gradually increasing duty cycle of the switch in a predetermined soft-connecting period after compensation voltage of the compensation node exceeds the predetermined value.

12. A method of controlling a switched-mode power supply comprising a power switch and an inductive device, the power switch utilized for controlling energizing or de-energizing of the inductive device, the switched mode-power supply further comprising a compensation capacitor coupled to a compensation node, compensation voltage of the compensation node responsive to output power of the switched-mode power supply, the method comprising:
    providing a resistive device;
    setting equivalent resistance of the resistive device to a first predetermined value after compensation voltage of the compensation node falls below a predetermined value; and
    gradually reducing equivalent resistance of the resistive device to a second predetermined value in a predetermined soft-connection period after compensation voltage of the compensation node exceeds the predetermined value.

13. The method of claim 12, wherein the resistive device is coupled between the compensation node and a power node.

14. The method of claim 12, wherein the second predetermined value is lower than the first predetermined value.

* * * * *